July 24, 1956  D. RIVA  2,756,071
FRAME SPRINGING OF BICYCLES OR LIGHT MOTORCYCLES
Filed Dec. 27, 1951
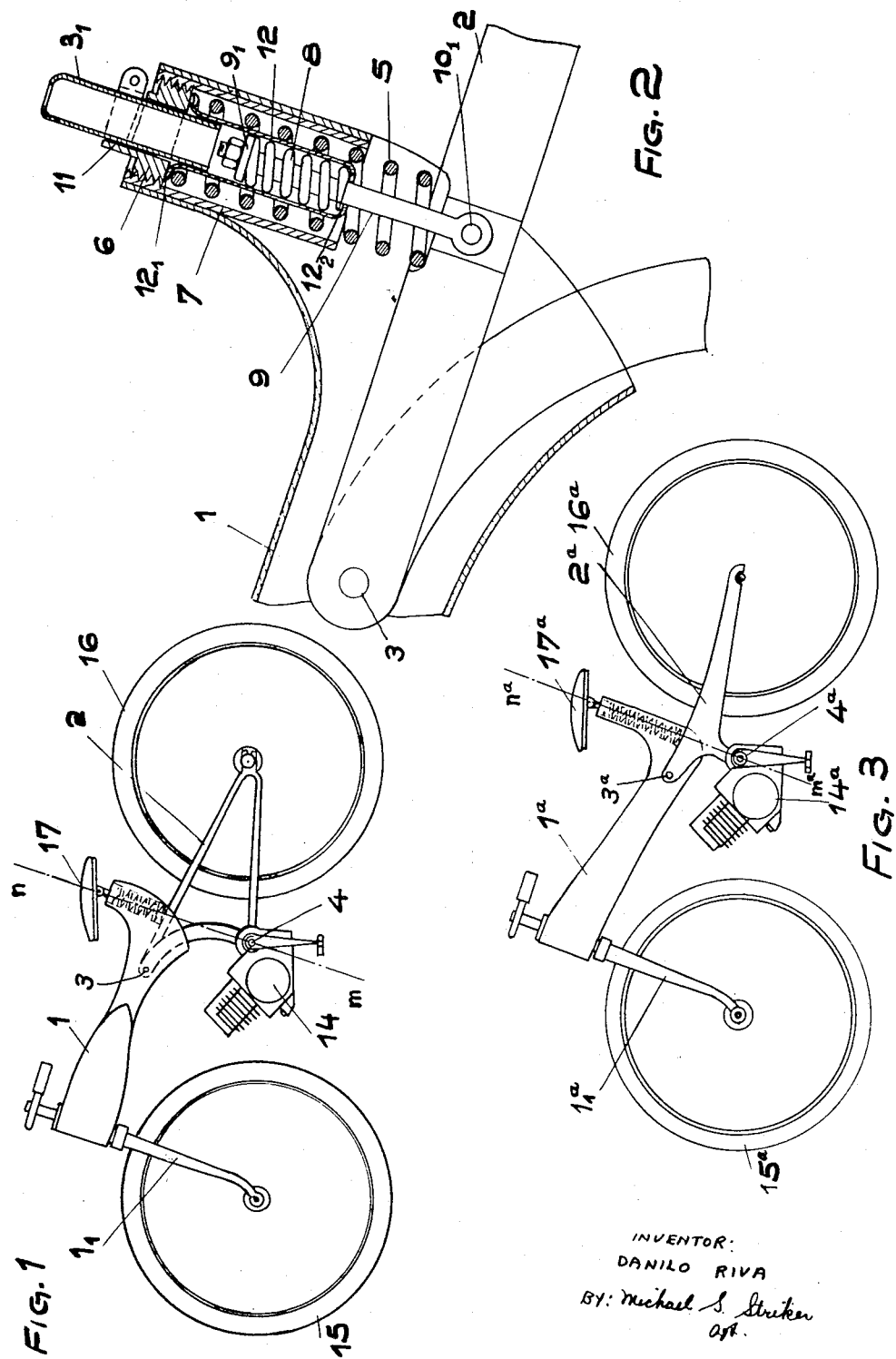
INVENTOR:
DANILO RIVA
BY: Michael S. Striker United States Patent Office 2,756,071
Patented July 24, 1956

2,756,071

FRAME SPRINGING OF BICYCLES OR LIGHT MOTORCYCLES

Danilo Riva, Paris, France

Application December 27, 1951, Serial No. 263,562

Claims priority, application France December 29, 1950

3 Claims. (Cl. 280—283)

There exist in the art unnecessary devices for springing cycles, motor-assisted cycles, light motor-cycles and similar vehicles.

In a general manner, springing is obtained either in a partial manner by employing spring forks or an elastic spring hub for the front wheel, or in a more complete manner, by also and conjointly adopting a springing device for the back wheel. This springing of back wheels is generally obtained by oscillating the part of the frame which holds the back wheel, this part of the frame being subjected to the action of springs which bear on the fixed part of the frame.

Partial springing, of the front wheel only, does not give all the efficiency desirable.

The complete springing obtained as mentioned above, by two separate devices, is generally expensive to fit.

The purpose of the present invention is more particularly to obviate the above disadvantages.

To this end, the present invention relates to a vehicle such as a cycle, light motor-cycle or similar vehicle, characterized in that the frame comprises two parts subjected to the action of elastic members, which frame parts are connected to each other by a joint arranged in the central part of the frame so as to take up the shocks of one of the parts of the frame in relation to the other. This arrangement enables the integral springing of the vehicle to be obtained in a simple and economical manner.

According to the preferred embodiments of the invention, the joint connecting the two parts of the frame is arranged in front of the plane passing through the saddle and the pedal gear axis.

According to the preferred embodiments, elastic spring members are interposed between the two parts of the joined frame and also act on these two parts.

According to the preferred embodiments, the spring device comprises two elastic members acting in opposite directions and bearing, on the one hand, on the saddle tube, and on the other hand, on each of the parts of the frame, this spring arrangement adding considerably to the rider's comfort.

In connection with new commercial products, the invention also relates to the frames of cycles, light motor-cycles or similar vehicles, in accordance with one or more of the preceding paragraphs.

The invention also applies to the characteristics hereinafter described and to their various possible combinations.

Vehicles in accordance with the present invention are shown, by way of non-restrictive example, in the attached drawings, in which:

Figure 1 is a general elevation view of a first preferred embodiment.

Figure 2 is a detailed elevational view, partly in section, of a preferred embodiment of the spring device of the motor-assisted cycle of Figure 1.

Figure 3 is an elevation view of another preferred embodiment.

According to the invention, the bicycle frame shown in Figs. 1 and 2 of the drawings comprises a front part 1 and a rear part 2 connected to each other by a joint 3, this joint being arranged in the central part of the frame, and more precisely in front of the plane $mn$ passing through the axis of the saddle tube 3, and the axis of the pedal gear 4. The parts 1 and 2 are aligned along a longitudinal fore and aft axis of the bicycle.

The front part 1 holds the front fork $1_1$ in which the wheel 15 is fitted. This part 1 also holds the saddle 17, as will be described below.

The rear part 2 forms the fork of the back wheel 16. When the vehicle is driven—as in present cases—by an auxiliary motor 14 or the like acting on the back wheel 16, this motor is fitted on the rear part 2.

The elastic spring arrangement or mounting of vehicles thus constituted is ensured by a shock-absorber device the details of which are shown in Figure 2. This device comprises a main spring 5, pressing, on the one hand, on the back fork, and on the other hand, on a ring 6 screwed into the guide column 7 which is fixed to the front part 1 of the frame.

The shock-absorber device also comprises a secondary spring 8 intended to take up the inverse reactions of the springing. This spring presses on flange $12_2$ near the bottom of the tube 12 and engages a flange $9_1$ of the rod 9 which is joined at $10_1$ to the rear part of the frame. The tube 12 has a rim $12_1$ at its top part, inserted between the spring 5 and the ring 6.

The top part 11 of the ring 6 forms a collar for tightening and fixing the saddle tube $3_1$.

This arrangement can be applied to the frames of cycles and all similar vehicles, but more particularly to the frames of motor-assisted cycles.

It is quite clear that the parts 1 and 2 of the frame can undergo certain transformations without going outside the scope of the invention for this. For example, the position of the joint axle can be lowered, by using a front part $1^a$ in the shape shown in Figure 3, so as to provide a lady's bicycle or the like.

In the embodiment of Fig. 3, the front part $1^a$ includes a fork $1_1^a$ which supports a front wheel $15^a$ and a rear part $2^a$, which is pivotally connected to the front frame $1^a$ at $3^a$ and supports a rear wheel $16^a$. The front part $1^a$ carries a saddle $17^a$ and the rear part $2^a$ carries an auxiliary motor $14^a$. The plane $m^a n^a$ passes through the axis of the saddle tube and the axis of the pedal gear $4^a$, and is rearwardly of the joint $3^a$.

Improvements can also be applied to the frames described, such as a device for regulating the tension of the spring 5 of the spring device. This may be accomplished by rotating the ring 6 relative to the tube 7, so as to move the former along the axis of the tube.

It is obvious that, without going outside the scope of the invention, which principally seeks to simplify the springing of vehicles such as cycles or the like, it is furthermore possible to utilize auxiliary spring means for the saddle, handlebars, and even the wheels.

What I claim is:

1. A vehicle, comprising, in combination, a front frame and a rear frame, said frames being aligned along a longitudinal fore and aft axis of the vehicle and pivotally connected to each other for turning movement relative to each other about a single lateral axis normal to said fore and aft axis, said front frame having a rear portion located rearwardly of said lateral axis; wheel means turnably mounted on each frame; an elongated guide tube on said rear portion of said front frame tilted rearwardly with respect to said fore and aft axis; elongated seat support means arranged coaxial with said guide tube and above at least a portion of said rear frame; a helical spring in said guide tube coaxial therewith and with said elongated seat support means and interconnecting said seat support means and said portion of said rear frame; an inner tube mounted within said guide tube, said inner tube having a flange means at the end thereof nearer to said portion of said rear frame; a connecting rod attached to said portion of said rear frame and extending into said inner tube coaxial therewith and having flange means at the end thereof remote from said portion of said rear frame; and spring means surrounding said connecting rod disposed between said flange means of said inner tube and said flange means of said connecting rod, whereby a shock absorbing connection is provided between said frames.

2. A vehicle comprising, in combination, a front frame and a rear frame, said frames being aligned along a longitudinal fore and aft axis of the vehicle and pivotally connected to each other for turning movement relative to each other about a single lateral axis normal to said fore and aft axis, said front frame having a rear portion located rearwardly of said lateral axis; wheel means turnably mounted on each frame; an elongated guide tube on said rear portion of said front frame tilted rearwardly with respect to said fore and aft axis; elongated seat support means arranged coaxial with said guide tube and above at least a portion of said rear frame; a helical spring in said guide tube coaxial therewith and with said elongated seat support means and interconnecting said seat support means and said portion of said rear frame; means adjustably in and abutting with said guide tube and said helical spring therein for adjusting the tension of said helical spring; an inner tube mounted within said guide tube, inner tube having a flange means at the end thereof nearer to said portion of said rear frame; a connecting rod attached to said portion of said rear frame and extending into said inner tube coaxial therewith and having flange means at the end thereof remote from said portion of said rear frame; and spring means surrounding said connecting rod disposed between said flange means of said inner tube and said flange means of said connecting rod, whereby a shock absorbing connection is provided between said frames.

3. A vehicle comprising, in combination, a front frame and a rear frame, said frames being aligned along a longitudinal fore and aft axis of the vehicle and pivotally connected to each other for turning movement relative to each other about a single lateral axis normal to said fore and aft axis, said front frame having a rear portion located rearwardly of said lateral axis; wheel means turnably mounted on each frame; an elongated guide tube on said rear portion of said front frame tilted rearwardly with respect to said fore and aft axis; elongated seat support means arranged coaxial with said guide tube and above at least a portion of said rear frame; a helical spring in said guide tube coaxial therewith and with said elongated seat support means and interconnecting said seat support means and said portion of said rear frame; a ring member threadably mounted within said guide tube and bearing against said helical spring therein and turnable for adjusting the tension of said helical spring; an inner tube mounted within said guide tube, said inner tube having a flange means at the end thereof nearer to said portion of said rear frame; a connecting rod attached to said portion of said rear frame and extending into said inner tube coaxial therewith and having flange means at the end thereof remote from said portion of said rear frame; and spring means surrounding said connecting rod disposed between said flange means of said inner tube and said flange means of said connecting rod, whereby a shock absorbing connection is provided between said frames.

References Cited in the file of this patent

UNITED STATES PATENTS

| | | |
|---|---|---|
| 446,098 | Hibert et al. | Feb. 10, 1891 |
| 465,599 | McGlinchey | Dec. 22, 1891 |
| 470,317 | Burton | Mar. 8, 1892 |
| 2,477,748 | Hutchins | Aug. 2, 1949 |

FOREIGN PATENTS

| | | |
|---|---|---|
| 417,421 | Italy | Jan. 18, 1947 |
| 426,402 | Italy | Oct. 24, 1947 |
| 431,221 | Italy | Feb. 25, 1948 |
| 435,204 | Italy | May 11, 1948 |